US010248652B1

(12) United States Patent
Venkataraman et al.

(10) Patent No.: US 10,248,652 B1
(45) Date of Patent: Apr. 2, 2019

(54) VISUAL WRITING AID TOOL FOR A MOBILE WRITING DEVICE

(71) Applicant: Google Inc., Mountain View, CA (US)

(72) Inventors: Vinay Venkataraman, Sunnyvale, CA (US); Eric Aboussouan, Campbell, CA (US); David Frakes, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/719,989

(22) Filed: Sep. 29, 2017

Related U.S. Application Data

(60) Provisional application No. 62/432,120, filed on Dec. 9, 2016.

(51) Int. Cl.
*G06F 17/28* (2006.01)
*G06F 3/0354* (2013.01)
(Continued)

(52) U.S. Cl.
CPC ...... *G06F 17/2854* (2013.01); *G06F 3/03545* (2013.01); *G06F 17/289* (2013.01); (Continued)

(58) Field of Classification Search
USPC ............................................ 710/72; 345/156
See application file for complete search history.

(56) References Cited

U.S. PATENT DOCUMENTS

| 6,289,140 B1 * | 9/2001 | Oliver ..................... G10L 15/30 382/313 |
| 6,603,464 B1 | 8/2003 | Rabin |

(Continued)

FOREIGN PATENT DOCUMENTS

| CN | 205210885 U | 5/2016 |
| WO | WO 2014/066660 | 5/2014 |

OTHER PUBLICATIONS

Frankenberger, "Technology: Livescribe Smartpen", The Yale Center for Dyslexia & Creativity, http://dyslexia.yale.edu/TECH_livescribe.html, retrieved on Nov. 17, 2016, 4 pages.
(Continued)

*Primary Examiner* — Tony O Davis
(74) *Attorney, Agent, or Firm* — Dority & Manning, P.A.

(57) ABSTRACT

Systems, methods, and apparatus of providing a visual writing aid are provided. In one example embodiment, a method includes obtaining data descriptive of a first set of information, wherein the first set of information is presented in a first language. The method includes determining a translation of the first set of information to a second language. The method includes presenting a visual representation of the translation of the first set of information in the second language via a display device. The method includes obtaining data descriptive of a second set of information. The second set of information includes a transcription of at least a portion of the first set of information in the second language generated via a mobile writing device. The method includes determining whether the second set of information corresponds to the visual representation of the translation of the first set of information in the second language.

20 Claims, 6 Drawing Sheets

(51) Int. Cl.
    *G06K 9/22* (2006.01)
    *G06F 3/16* (2006.01)
    *G06F 3/01* (2006.01)
    *G06F 3/03* (2006.01)
    *G06F 3/0346* (2013.01)
    *G06T 7/246* (2017.01)
    *G06K 9/00* (2006.01)

(52) U.S. Cl.
    CPC .............. *G06K 9/224* (2013.01); *G06F 3/016* (2013.01); *G06F 3/0304* (2013.01); *G06F 3/0346* (2013.01); *G06F 3/167* (2013.01); *G06K 9/00402* (2013.01); *G06K 2209/01* (2013.01); *G06T 7/246* (2017.01); *G06T 2207/30241* (2013.01)

(56) References Cited

U.S. PATENT DOCUMENTS

| | | | |
|---|---|---|---|
| 7,453,447 | B2 | 11/2008 | Marggraff et al. |
| 8,297,979 | B2 | 10/2012 | McIlvain et al. |
| 8,944,824 | B2 | 2/2015 | Marggraff |
| 9,195,697 | B2 | 11/2015 | Black et al. |
| 2002/0138249 | A1* | 9/2002 | Kanevsky ............ G02B 27/017 704/2 |
| 2003/0065504 | A1* | 4/2003 | Kraemer ............... G06F 17/289 704/8 |
| 2005/0112531 | A1 | 5/2005 | Maldonado et al. |
| 2005/0125228 | A1 | 6/2005 | Samuels |
| 2006/0154559 | A1* | 7/2006 | Yoshida ................ G06F 3/0317 446/297 |
| 2006/0229862 | A1* | 10/2006 | Ma .......................... G06F 3/038 704/4 |
| 2007/0005849 | A1* | 1/2007 | Oliver ................. G06F 3/03545 710/72 |
| 2008/0233980 | A1* | 9/2008 | Englund ............... G06F 17/289 455/466 |
| 2008/0243473 | A1* | 10/2008 | Boyd .................... G06F 17/289 704/2 |
| 2009/0267896 | A1 | 10/2009 | Hiramatsu |
| 2010/0138209 | A1* | 6/2010 | Harrenstien .......... G06F 17/289 704/2 |
| 2010/0324968 | A1* | 12/2010 | Schoettle .......... G06F 17/30545 705/14.54 |
| 2011/0112822 | A1 | 5/2011 | Caraher |
| 2013/0191781 | A1 | 7/2013 | Radakovitz et al. |
| 2014/0012563 | A1* | 1/2014 | Caskey ............. G06F 17/30669 704/2 |
| 2014/0067728 | A1 | 3/2014 | Ogren et al. |
| 2014/0072231 | A1 | 3/2014 | Sv et al. |
| 2014/0080104 | A1 | 3/2014 | Sato |
| 2014/0081620 | A1* | 3/2014 | Solntseva ............... G06F 17/28 704/3 |
| 2014/0118310 | A1 | 5/2014 | Black et al. |
| 2014/0118315 | A1 | 5/2014 | Black et al. |
| 2014/0123214 | A1 | 5/2014 | Black et al. |
| 2015/0116284 | A1 | 4/2015 | Black et al. |
| 2015/0134322 | A1* | 5/2015 | Cuthbert ............... G06F 17/289 704/3 |
| 2015/0134352 | A1 | 5/2015 | Strickland et al. |
| 2016/0162137 | A1 | 6/2016 | Black et al. |
| 2017/0017642 | A1* | 1/2017 | Cunningham ........ G06F 17/289 |
| 2018/0081456 | A1* | 3/2018 | Li ....................... G06F 3/03545 |
| 2018/0137108 | A1* | 5/2018 | Martinez Corria .......................... G06F 17/2854 |

OTHER PUBLICATIONS

LeapReader Reading and Writing System, www.leapfrog.com/en-us/products/reading-family, retrieved on Dec. 9, 2016, 6 pages.

* cited by examiner

VISUAL WRITING AID TOOL FOR A MOBILE WRITING DEVICE

CROSS-REFERENCE TO RELATED APPLICATION

The present application is based on and claims priority to U.S. Provisional Application 62/432,120 having a filing date of Dec. 9, 2017, which is incorporated by reference herein.

FIELD

The present disclosure relates generally to providing visual writing aids for use with a mobile writing device.

BACKGROUND

Writing notes by hand on paper or other surfaces can provide many advantages. For instance, taking notes by hand can improve recall and can allow users to maintain workflow processes. In some cases, reading information presented on paper can improve comprehension and can decrease visual stress and fatigue. Likewise, writing notes by hand may be more easily performed in a space-constrained or time-constrained environment.

Tools exist for digitally capturing information written by hand on paper or other surfaces. For instance, scanners can be used to create digital versions of information presented on paper or other surfaces. Digital pens can be used to record information by hand as information is written on specially tailored surfaces.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing a visual writing aid. The method includes obtaining, by one or more computing devices, data descriptive of a first set of information, wherein the first set of information is presented in a first language. The method includes determining, by the one or more computing devices, a translation of the first set of information to a second language. The method includes presenting, by the one or more computing devices, a visual representation of the translation of the first set of information in the second language via a display device. The method includes obtaining, by the one or more computing devices, data descriptive of a second set of information. The second set of information includes a transcription of at least a portion of the first set of information in the second language generated via a mobile writing device. The method includes determining, by the one or more computing devices, whether the second set of information corresponds to the visual representation of the translation of the first set of information in the second language.

Another example aspect of the present disclosure is directed to a computing system for providing a visual writing aid. The system includes one or more processors and one or more memory devices. The one or more memory devices store instructions that when executed by the one or more processors cause the one or more processors to perform operations. The operations include obtaining data descriptive of a first set of information in a first language. The operations include presenting a visual representation of a translation of the first set of information in the second language via a display device. The operations include obtaining data descriptive of a movement of a mobile writing device associated with a second set of information. The second set of information includes a transcription of at least a portion of the first set of information in the second language generated via the mobile writing device. The operations include determining whether the second set of information corresponds to the translation of the first set of information in the second language based at least in part on the movement of the mobile writing device.

Another example aspect of the present disclosure is directed to a user computing device that includes one or more display devices, one or more processors, and one or more memory devices. The one or more memory devices store instructions that when executed by the one or more processors cause the one or more processors to perform operations. The operations include obtaining data descriptive of a first set of information in a first language. The operations include presenting a visual representation of a translation of the first set of information in the second language via the one or more display devices. The operations include obtaining data descriptive of a second set of information. The second set of information includes a transcription of at least a portion of the first set of information in the second language on a surface. The transcription is generated via a mobile writing device. The operations include determining whether the second set of information corresponds to the translation of the first set of information in the second language.

Other example aspects of the present disclosure are directed to systems, apparatus, tangible, non-transitory computer-readable media, user interfaces, memory devices, and electronic devices for providing aid to a user of a mobile writing device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
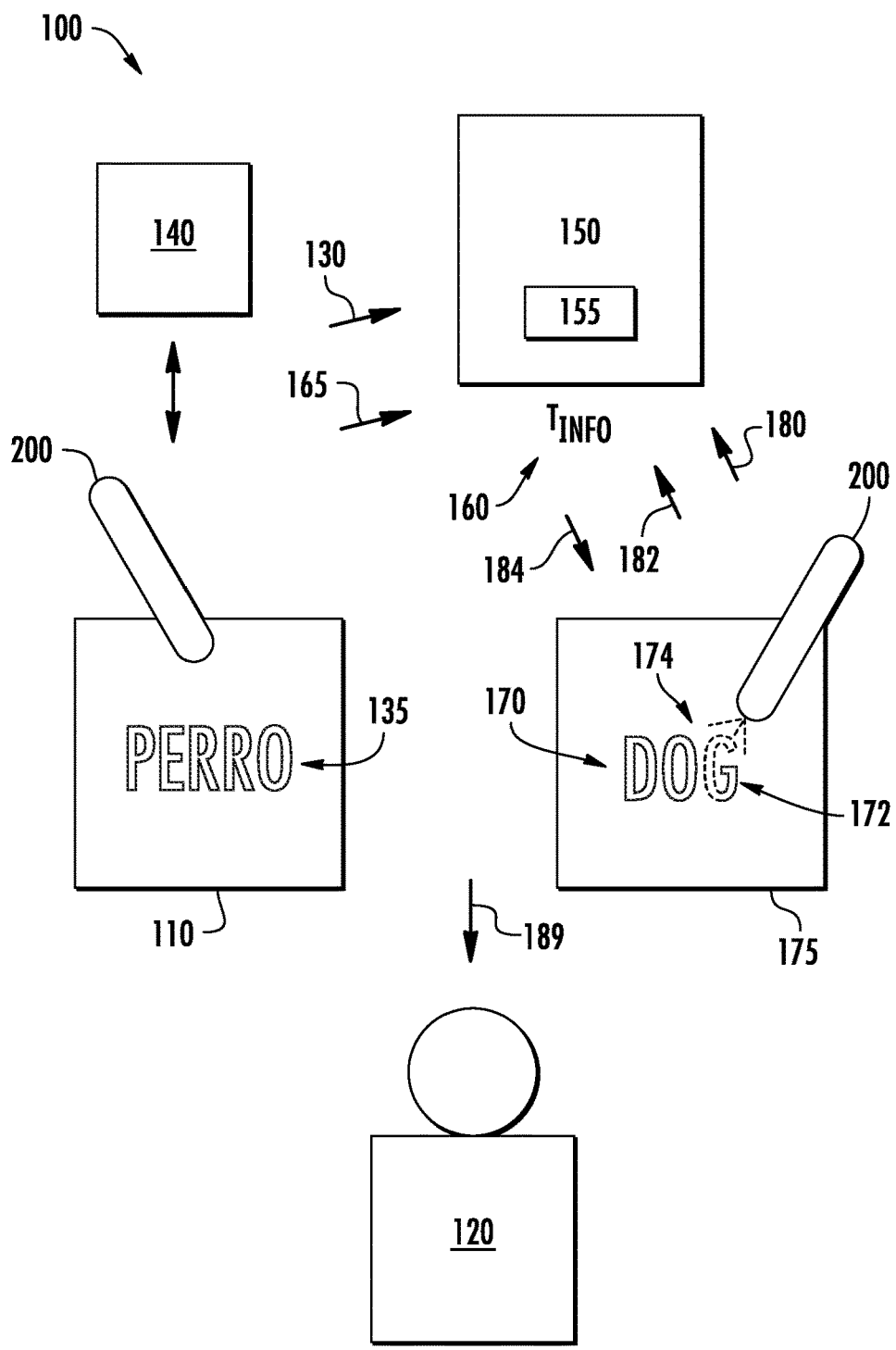
FIG. 1 depicts an overview of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing a visual writing aid for a user of a mobile writing device. In some implementations, a mobile writing device having a form factor similar to a pen can be used to write information on a surface (e.g., a paper, other surface) in a first language. For example, the information can include one or more word(s) written in Spanish (e.g., "PERRO"). The mobile writing device can include various image capture devices, sensors, processors, memory devices, and other devices to acquire data (e.g., image data) descriptive of the first set of information (e.g., as it is written using the device). The mobile writing device can send the data descriptive of the first set of information in the first language to a user device (e.g., a mobile user device). The user device can determine a translation of the first set of information to a second language (e.g., English). To help aid a user of the mobile writing device, the user device can present a visual representation of the translated information on a user interface via a display device. The user can then utilize the visual representation of the translated information to help the user create a transcription using the mobile writing device. The transcription can include the information in the second language (e.g., an English transcription of the translated information). The user device can monitor the trajectory of the mobile writing device as the user transcribes the translated information. Moreover, the user device can provide feedback (e.g., visual, audio, haptic) to the user indicating whether the user's transcription corresponds to the visual representation (e.g., whether it is an accurate representation of the translated information) and/or the user's progress. In this way, a user device can provide a visual writing aid that can help a user to accurately transcribe translated information via a mobile writing device.

More particularly, the user device can obtain data descriptive of a first set of information (e.g., text). The first set of information can be presented in a first language (e.g., Spanish). The first set of information can be presented on a first surface (e.g., paper). In some implementations, the first set of information can be generated via the mobile writing device. For instance, a user can generate a first set of information (e.g., including one or more word(s) in Spanish) using the mobile writing device on a piece of paper. In some implementations, the user device can obtain (e.g., in real-time, near real-time) data descriptive of the first set of information while the first set of information is generated via the mobile writing device on the first surface. In some implementations, the first set of information can have already been presented on the first surface (e.g., as text in a magazine not generated by the mobile writing device).

The user device can determine a translation of the first set of information to a second language (e.g., English). By way of example, the English translation of the Spanish word "PERRO" into English is "DOG". As further described herein, the user device can itself generate the translation of the first set of information to the second language and/or receive data descriptive of the translation from another device (e.g., the mobile writing device, another computing system).

The user device can present a visual representation of the translation of the first set of information in the second language via a display device (e.g., of the user device). By way of example, the user device can present a visual representation via a user interface for the user to view. The visual representation can be a textual representation of the translation of the first set of information in the second language (e.g., a visual representation of the word "DOG"). The visual representation can aid the user to transcribe (e.g., using the mobile writing device) the information presented in the visual representation.

The user device can obtain data descriptive of a second set of information. The second set of information can include a transcription of at least a portion of the first set of information in the second language generated via a mobile writing device. The second set of information can be presented on a surface. Additionally, or alternatively, the second set of information can be gestured (e.g., in air) without presenting written information onto the second surface. This can allow the user to practice transcribing the translation of the first set of information without writing anything onto a surface. As further described herein, the user device can obtain the data descriptive of a second set of information from the mobile writing device (e.g., in real-time, near real-time) while the second set of information is generated.

The user device can determine whether the second set of information corresponds to the visual representation of the translation of the first set of information in the second language. By way of example, the user device can determine whether the transcription of the English word "DOG" is an accurate transcription of the translation of the first set of information (e.g., the Spanish word "PERRO") as it appears in the visual representation. In some implementations, the correspondence can be based, at least in part, on the movement (and/or predicted movement) of the mobile writing device, as further described herein. The user device can provide feedback to a user of the mobile writing device indicating whether the second set of information corresponds to the translation 160 of the first set of information. The feedback can include at least one of visual feedback, audio feedback, and haptic feedback.

The system, methods, and apparatuses described herein may provide a number of technical effects and benefits. The user device can monitor and provide a user feedback regarding the accuracy of a transcription into another language. This can be done while the user is generating the transcription. As such, the user can get real-time (or near-time) feedback as to the accuracy of the user's transcription. Accordingly, the user can adjust his/her use of the mobile writing device in accordance with the feedback to address any inaccuracies. This can prevent the user from wholly redoing a transcription, thereby saving processing and storage resources of the mobile writing device that would be used for such a revision.

The system, methods, and apparatuses of the present disclosure also provide an improvement to computing technology, such as mobile writing device computing technology. For instance, the system, methods, and apparatuses enable the mobile writing device to leverage the processing and display resources of a user device to provide a visual aid to a user of the mobile writing device. For example, system, methods, and apparatuses can allow a user device to obtain data descriptive of a first set of information in a first language, present a visual representation of a translation of the first set of information in the second language via a display device, obtain data descriptive of a second set of information, and determine whether the second set of information corresponds to the translation of the first set of information in the second language. As such, the system, methods, and apparatuses of the present disclosure can improve a mobile writing device's ability to aid a user by communicating with a user device rather than adding additional processing and display hardware to the mobile writing device. This can allow the mobile writing device to maintain a more cost effective and streamed hardware architecture, as well as allow the computational resources (e.g., processing, memory) of the mobile writing device to focus on the more core functions of the mobile writing device.

FIG. 1 depicts an overview of an example system 100 according to example embodiments of the present disclosure. The system 100 can include a mobile writing device 200 and a user device 150. The mobile writing device 200 and the user device 150 can be configured to communicate with one another via one or more network(s), as further described herein. Accordingly, the mobile writing device 200 and the user device 150 can provide and/or receive data, signals, etc. to and/or from one another.

A user 120 can use the mobile writing device 200 to write or provide information on a first surface 110. The first surface 110 can be a paper surface, such as a portion of a sheet of paper, a notepad, a notebook, a prescription pad, sheet music, journal, card, or other suitable surface used by individuals to write information by hand. In some embodiments, the surface has material already written or printed on the surface, such as a menu, poster, book, newspaper, magazine, or other surface. The mobile writing device 200 can have the form factor of a pen (as further described herein) or other writing utensil. For instance, the mobile writing device 200 can have a size, shape, and geometry similar to a pen or other writing utensil that is easy for a user to hold and use to write information by hand.

The user 120 can write on the surface by transferring ink, graphite, lead, colored fluids, or other suitable writing material from the mobile writing device 200 to the surface 110. For instance, the mobile writing device 200 can have a tip (e.g., a ball point tip, roller ball tip, fiber tip, fountain tip, or other suitable tip) that when applied to the first surface 110 transfers the writing material to the surface 110. In this way, user 120 can manually handwrite information onto the first surface 110 using the mobile writing device 200. By way of example, in some implementations, the mobile writing device 200 can generate information in a first language (e.g., Spanish) on the first surface 110. The information can be presented as textual information (e.g., written text), characters, numbers, symbols, etc. on the first surface 110.

The mobile writing device 200 can be configured to acquire data associated with information presented on a surface and/or associated with the mobile writing device 200. For instance, as will be further described herein, the mobile writing device 200 can be configured to acquire images of information presented on the surface 110. Such information (e.g., written text) can be generated by the mobile writing device 200 and/or can already be presented on the surface 110. Additionally, and/or alternatively, as will be further described herein, the mobile writing device 200 can be configured to acquire data associated with the movement of the mobile writing device 200. The mobile writing device 200 can be configured to provide such data to a computing system 140 and/or to the user device 150.

The computing system 140 can include one or more computing devices, such as one or more servers, databases, desktop, laptops, mobile devices, and other computing devices. The computing system 140 can include one or more processors and one or more memory devices. The one or more memory devices can store computer-readable instructions that when executed by the one or more processors cause the one or more processors to perform operations, such as processing data (e.g., images) acquired by the mobile writing device 200 to identify information written or provided on the surface. The computing system 140 is illustrated as being remote from the mobile writing device 200 in the example embodiment illustrated in FIG. 1. Those of ordinary skill in the art, using the disclosures provided herein, will understand that in some embodiments, the computing system 140 can be included as part of the mobile writing device 200.

The information written by the user 120 and/or generated on the surface 110 by the mobile writing device 200 can be stored in the computing system 140 in digital form. In this manner, a digital record can be generated of the information on the surface 110. The user 120 can access or request the digital record of such information from the computing system 140 for a variety of purposes. For instance, the user 120 can access an application executed on the computing system 140 to access and view the digital record of the information in a suitable graphical user interface.

The user device 150 can be various types of user computing devices and components. For instance, the user device 150 can include a smartphone, laptop, tablet, wearable device such as a smart watch, and/or other user computing devices. The user device 150 can include multiple components for performing various operations and functions. For example, the user device 150 can include and/or otherwise be associated with one or more computing device(s) 155. The one or more computing device(s) 155 can be configured to perform the operations and functions of the user device 150, as described herein. For instance, the one or more computing device(s) 155 can include one or more processor(s) and one or more memory device(s). The one or more memory device(s) can store instructions that when executed by the one or more processor(s) cause the one or more processor(s) to perform operations and functions, such as those for providing a visual writing aid, as described herein.

The user device 150 can be configured to obtain data 130 descriptive of a first set of information 135 in a first language. The first set of information 135 can be presented as textual information (e.g., written text), characters, numbers, symbols, etc. on the first surface 110. For instance, the first set of information 135 (e.g., "PERRO") can be presented on a surface 110 in a first language (e.g., Spanish). The first set of information 135 can include information (e.g., written text, characters, or the like) generated via the mobile writing device 200. Additionally, or alternatively, the first set of information 135 can include information already present on the surface, such as printed text, previously written information, form questions, graphics, logos, and/or other information.

The user device 150 can obtain the data 130 descriptive of a first set of information 135 (e.g., in the first language) from the mobile writing device 200. The mobile writing device 200 can acquire data descriptive of the first set of information 135 and provide the data 130 to the user device 150. In some implementations, the user device 130 can obtain (e.g., in real-time, near real-time) the data 130 descriptive of the first set of information 135 while the first set of information 135 is generated via the mobile writing device 200 on the first surface 110.

Additionally, or alternatively, the user device 150 can obtain the data 130 descriptive of the first set of information 135 from a computing device other than the mobile writing device 200. For example, in some implementations, the computing system 140 can be separate and apart from the mobile writing device 200. The computing system 140 can provide the data 130 descriptive of the first set of information 135 to the user device 150. In such a case, the data 130 can have been acquired via the mobile writing device 200 (and provided to the computing system 140) and/or by the computing system 140 (e.g., via user input in a manner similar to that provided below). In some implementations, the data 130 can be generated by the computing system 140 after processing other data (e.g., image data obtain via the mobile writing device 200).

Additionally, or alternatively, the user device 150 can receive data 130 descriptive of the first set of information 135 via user input of the user 120. For instance, the user 120 can provide a text user input to the user device 150 (e.g., via a touchscreen, keyboard) and/or a voice user input to the user device (e.g., via a microphone). The user input can be descriptive of the first set of information 135 (e.g., of the word "PERRO," the Spanish word for "DOG"). The user device 150 can process the user input (e.g., via text, voice recognition techniques) to obtain the data 130 descriptive of the first set of information 135.

The user device 150 can be configured to determine a translation 160 of the first set of information 135 to a second language. The user device 150 can include translation software that can be used to process the data 130 indicative of the first set of information 135 (e.g., to parse the data, recognize language) and translate the first set of information 135 to a second language. By way of example, the user device 150 can translate the first set of information 135 (e.g., "PERRO") from a first language (e.g., Spanish) to a second language (e.g., English) to generate the translation 160 (e.g., "DOG") of the first set of information 135.

Additionally, or alternatively, the user device 150 can receive the translation 160 of the first set of information 135 from another device. For instance, in some implementations, the mobile writing device 200 can include translation software and/or processing capabilities to process data descriptive of the first set of information 135 (e.g., to parse the data, recognize language). The mobile writing device 200 can translate the first set of information 135 (e.g., in Spanish) to the second language (e.g., English). The user device 150 can obtain, from the mobile writing device 200, data 165 descriptive of the translation 160 of the first set of information 135 in the second language. In some implementations, the user device 150 can obtain the data 165 descriptive of the translation 160 of the first set of information 135 in the second language from a device other than the mobile writing device 200 (e.g., from computing system 140, other computing device).

Figure 2:
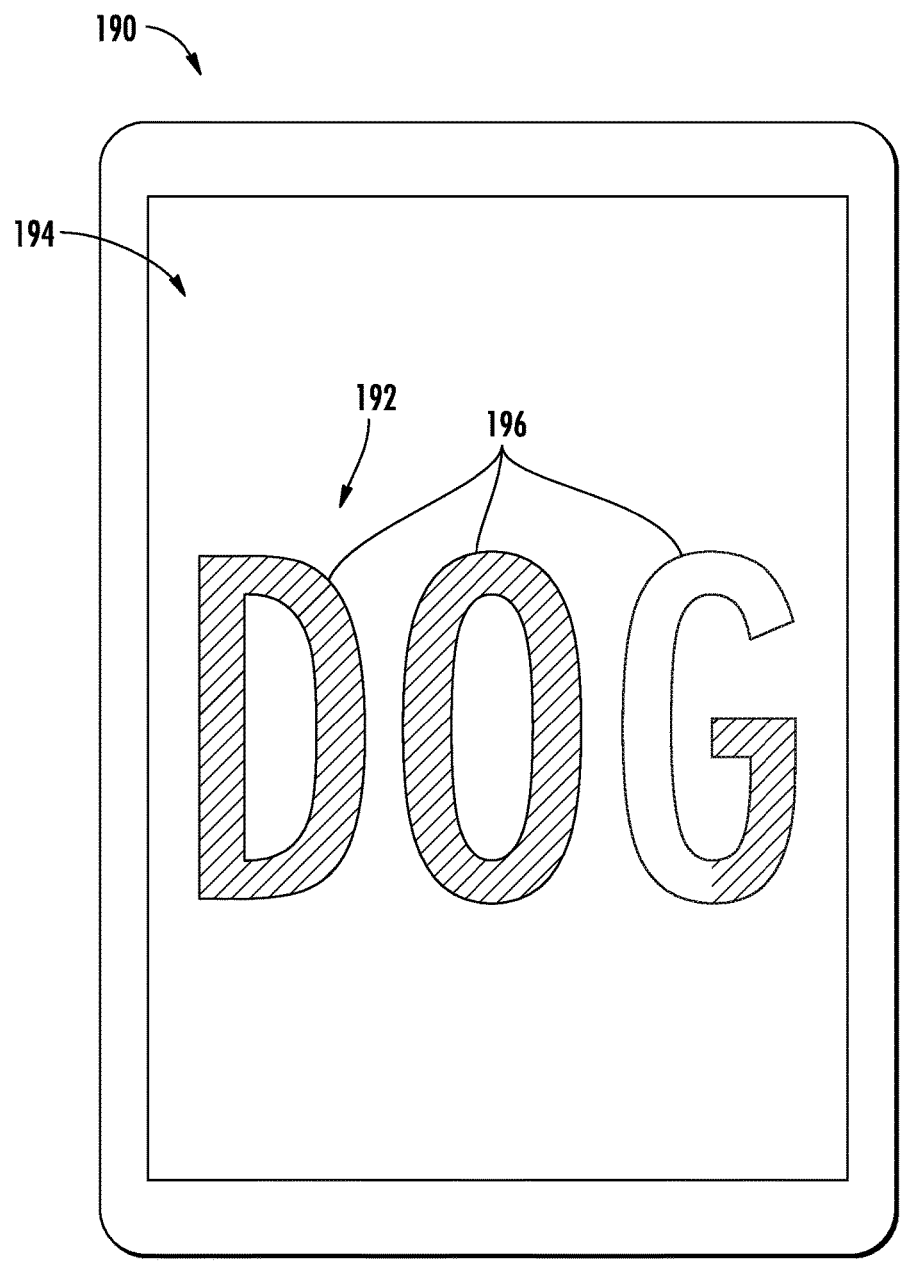
FIG. 2 depicts an example display device with an example user interface according to example embodiments of the present disclosure.

The user device 150 can be configured to present a visual representation of a translation of the first set of information in the second language via one or more display device(s). For instance, FIG. 2 depicts an example display device 190 according to example embodiments of the present disclosure. The display device 190 can be included and/or otherwise associated with the user device 150. The user device 150 can present the visual representation 192 via the user interface 194. The visual representation 192 can be a representation that is visible by a user (e.g., 120). By way of example, the visual representation 192 can be a textual representation of the translation of the first set of information 135 in the second language. The visual representation 192 can aid the user 120 to transcribe (e.g., using the mobile writing device 200) the information presented in the visual representation 192.

Returning to FIG. 1, the user 120 can utilize the mobile writing device 200 to generate a second set of information 170. As shown in FIG. 1, the second set of information 170 can include a transcription of at least a portion of the first set of information 135 in the second language. The transcription can be generated via the mobile writing device 200. For example, the user 120 can utilize the mobile writing device 200 to handwrite the transcription of at least a portion of the first set of information 135 in the second language (e.g., "DOG") on a second surface 175. In some implementations, the second set of information 170 can be presented as written text on the second surface 175 that is different from the first surface 110. In some implementations, the second surface 175 can be the same as the first surface 110. During transcription, the user 120 can observe the visual representation 192 to aid the user in transcribing the first set of information 135 in the second language (e.g., "English"). As such, the systems, methods, and apparatuses of the present disclosure can help a user communicate in a language in which the user 120 is not literate, fluent, etc.

In some implementations, the second set of information 170 need not be presented on a surface. For example, the user 120 can utilize the mobile writing device 200 to gesture (e.g., in the air) the transcription of at least a portion of the first set of information 135 in the second language (e.g., "DOG"). In this way, the user 120 can practice transcribing the second set of information 170 before handwriting anything on the second surface 175.

The user device 150 can be configured to obtain data 180 descriptive of the second set of information 170. For instance, the mobile writing device 200 can acquire data descriptive of the second set of information 170. The mobile writing device 200 can acquire images of the second surface 175 that include the second set of information 170. Additionally, or alternatively, the mobile writing device 200 can capture data associated with the movement of the mobile writing device 200, as further described herein. This can be helpful, for instance, in the implementations in which the user 120 does not handwrite the second set of information 170, because the mobile writing device 200 may not be able to capture images of information presented on a surface. The mobile writing device 200 can provide data 180 descriptive of the second set of information 170 to the computing system 140 and/or the user device 150. Accordingly, the user device 150 can obtain the data 180 descriptive of the second set of information 170 (e.g., from the mobile writing device 200, from the computing system 140). In some implementations, the user device 150 can obtain the data 180 descriptive of the second set of information 170 in real-time and/or near real-time. For instance, the mobile writing device 200 can provide data 180 descriptive of the second information as it is generating the transcription of the translation 160.

The user device 150 can be configured to determine whether the second set of information 170 corresponds to the translation 160 of the first set of information 135 in the second language. For instance, the user device 150 can determine whether the second set of information 170 corresponds to the visual representation 160 of the translation 160 of the first set of information 135 in the second language. The second set of information 170 can be considered to correspond to the translation 160 when the transcription of the first set of information 135 in the second language is the same as, substantially similar, and/or similar to the visual representation 192 of the translation 160.

Similarity can be measured by the user device 150 based, at least in part, on a deviation of the transcription from the visual representation 192. For instance, the user device 150 can process the data 180 descriptive of the second set of information 170 to identify one or more character(s) of the transcription. The user device 150 can analyze the respective character(s) to determine one or more characteristic(s) of the individual characters and/or the transcription as a whole. The characteristic(s) can include, for example, shape, size, orientation, position (e.g., relative position of characters to other characters, relative position of portions of characters to other portions of characters), and/or other characteristics. The user device 150 can compare the transcription, the character(s) of the transcription, and/or the characteristic(s) associated with the transcription and/or the characters to the visual representation 192 to determine to what degree the second set of information 170 deviates from the visual representation 192 of the translation 160 of the first set of information 135. The deviation may be based, at least in part, on a difference in the characteristic(s) between the transcription and the visual representation 192. In some implementations, if the difference is less than a threshold deviation (e.g., magnitude of difference in shape, size, etc. of one or more character(s)), the user device 150 can determine that the second set of information 170 corresponds to the visual representation 192 of the translation 160 of the first set of information 135 in the second language.

In some implementations, the user device 150 can be configured to determine whether the second set of information 170 corresponds to the translation 160 of the first set of information 135 based, at least in part, on a movement of the mobile writing device 200. For example, the user device 150 can obtain data 182 descriptive of a movement of the mobile writing device 200 associated with the second set of information 170. In some implementations, the user device 150 can obtain the data 182 descriptive of a movement of the mobile writing device 200 in real-time or near real-time. The user device 150 can be configured to obtain the data 182 descriptive of a movement of a mobile writing device 200 as the mobile writing device 200 generates the transcription. Such data can be used to determine whether the transcription generated (or to be generated) by the mobile writing device 200 corresponds to the translation 160 of the first information 135.

The user device 150 can determine a trajectory 172 of the mobile writing device 200 based, at least in part, on the movement of the mobile writing device 200. For instance, the trajectory 172 can be indicative of the path followed (and/or to be followed) by the mobile writing device 200 when generating at least a portion of the transcription that is already generated, being generated, and/or to be generated. By way of example, the trajectory 172 of the mobile writing device 200 shown in FIG. 1, can be the path followed by the mobile writing device 200 when generating the transcription (e.g., "DOG") and/or the path predicted to be followed by the mobile writing device 200 (e.g., based on the data 182 descriptive of the movement of the mobile writing device 200) while completing the transcription "DOG".

The user device 150 can be configured to determine whether the second set of information 170 corresponds to the translation 160 of the first set of information 135 based, at least in part, on the trajectory 172 of the mobile writing device 200. For instance, the user device 150 can compare the trajectory 172 of the mobile writing device 200 to the translation 160 of the first set of information 135 in the second language (e.g., the visual representation 192 thereof). The user device 150 can determine the second set of information 170 corresponds to the translation 160 of the first set of information 135 based, at least in part, on a comparison of the trajectory 172 of the mobile writing device 200 to the translation 160. By way of example, the user device 150 can compare the trajectory 172 for the transcription (e.g., "DOG") to the visual representation 192 to determine whether the mobile writing device 200 has followed and/or is following a path to generate a transcription that is, and/or will appear as, similar to the visual representations 192 (e.g., such that a reader could recognize the transcription as the translation 160 of the first set of information 135).

In some implementations, the user device 150 can be configured to determine a target trajectory 174 for the mobile writing device 200. For instance, the user device 150 can determine a target trajectory 174 for the mobile writing device 200 based, at least in part, on the textual representation of the translation 160 of the first set of information 135 in the second language. By way of example, a textual representation of the translation 160 of the first set of information 135 (e.g., "PERRO") can be "DOG". The target trajectory 174 of the mobile writing device 200 can be a textual representation of the word "DOG".

The user device 150 can compare the actual trajectory 172 of the mobile writing device 200 to the target trajectory 174 to determine whether the second set of information 170 corresponds to the translation 160 of the first set of information 135. For instance, the user device 150 can obtain data 182 descriptive of a movement of the mobile writing device 200. The user device 150 can determine an actual trajectory 172 of the mobile writing device 200 based, at least in part, on the movement of the mobile writing device 200. The user device 150 can determine whether the second set of information 170 corresponds to the translation 160 of the first set of information 135 (e.g., the visual representation 192 thereof) based, at least in part, a comparison of the target trajectory 174 of the mobile writing device 200 and the actual trajectory 172 of the mobile writing device 200. In this way, the user device 150 can determine whether the user 120 is accurately transcribing the translation 160 and/or whether the transcription 160 deviates from a textual representation of the translation (e.g., beyond a threshold level).

In some implementations, the user device 150 can provide data 184 descriptive of the target trajectory 174 to the mobile writing device 200. The mobile writing device 200 can be configured to present the target trajectory 174 on the second surface 175. For instance, the mobile writing device 200 can be configured to project the target trajectory 174 onto the second surface 175 (e.g., via one or more lighting element(s)). The target trajectory 174 can appear on the second surface 175 to aid a user 120 of the mobile writing device 200 to generate an accurate transcription of the translation 160.

The user device 150 (and/or the mobile writing device 200) can be configured to provide feedback 189 to the user 120 indicating the accuracy of the transcription. For instance, the user device 150 can be configured to provide audio feedback to the user 120 indicating that the transcription of the translation 160 of the first information 135 in the second language is sufficiently similar to the translation 160 of the first information 135 (e.g., the visual representation 192 thereof) and/or deviates from the translation 160 of the first information 135 (e.g., the visual representation 192 thereof). By way of example, the audio feedback can be provided via an audio output device (e.g., speaker) and can audibly communicate that "the transcription accurately represents the translation" and/or "the transcription is deviating from the translation".

In some implementations, the feedback 189 can include haptic feedback. For example, the user device 150 can determine that the transcription and/or trajectory 172 of the mobile writing device 200 deviates from the visual representation 192 of the translation 160 of the first set of information 135 in the second language (e.g., beyond a threshold). The user device 150 can provide one or more control signal(s) to the mobile writing device 200 indicative of the feedback 189. The mobile writing device 200 can be configured to receive the one or more control signal(s) indicative of the feedback 189. The mobile writing device 200 can provide the haptic feedback (e.g., vibration) to the user 120 to indicate that the transcription deviates from the translation 160 of the first information 135 in the second language.

In some implementations, the feedback 189 can include visual feedback. The user device 150 can provide visual feedback to the user 120 indicating the user's progress in transcribing the translation 160 of the first set of information 135 in the second language. For example, as shown in FIG. 2, the user device 150 can adjust one or more element(s) 196 of the visual representation 192 to indicate a progress associated with the second set of information 170 as the transcription is generated via the mobile writing device 200. The progress can be indicated by a change in one or more color(s), patterns, and/or other visual effects associated with the visual representation 192. By way of example, the visual representation 192 can change from red to green as the user 120 completes the transcription.

Additionally, or alternatively, the user device 150 can provide visual feedback via one or more other element(s) associated with the user interface 194. Such visual feedback can include one or more of textual messages, lighting (e.g., brightness, resolution) effects, images, etc. associated with the user interface 194. For example, the user device 150 can provide a textual message (e.g., appearing with or without the visual representation 192) that indicates to the user 120 that the transcription of the second set of information 170 corresponds and/or does not correspond to the translation 160 of the first set of information 135. Additionally, or alternatively, the user device 150 can present one or more images, emojis, and/or other visual elements that indicate to the user that the transcription of the second set of information 170 corresponds and/or does not correspond to the translation 160 of the first set of information 135. This can include, for example, a frowning face emoji when the transcription of the second set of information 170 corresponds and/or a smiling face emoji when the transcription of the second set of information 170 does not correspond. Additionally, or alternatively, the user device 150 can provide a flashing light and/or blinking visual representation 192 to indicate to the user 120 that the transcription of the second set of information 170 corresponds and/or does not correspond to the translation 160 of the first set of information 135. In this way, the user device 150 can aid the user 120 as the user 120 attempts to transcribe the second set of information 170.

Figure 3:
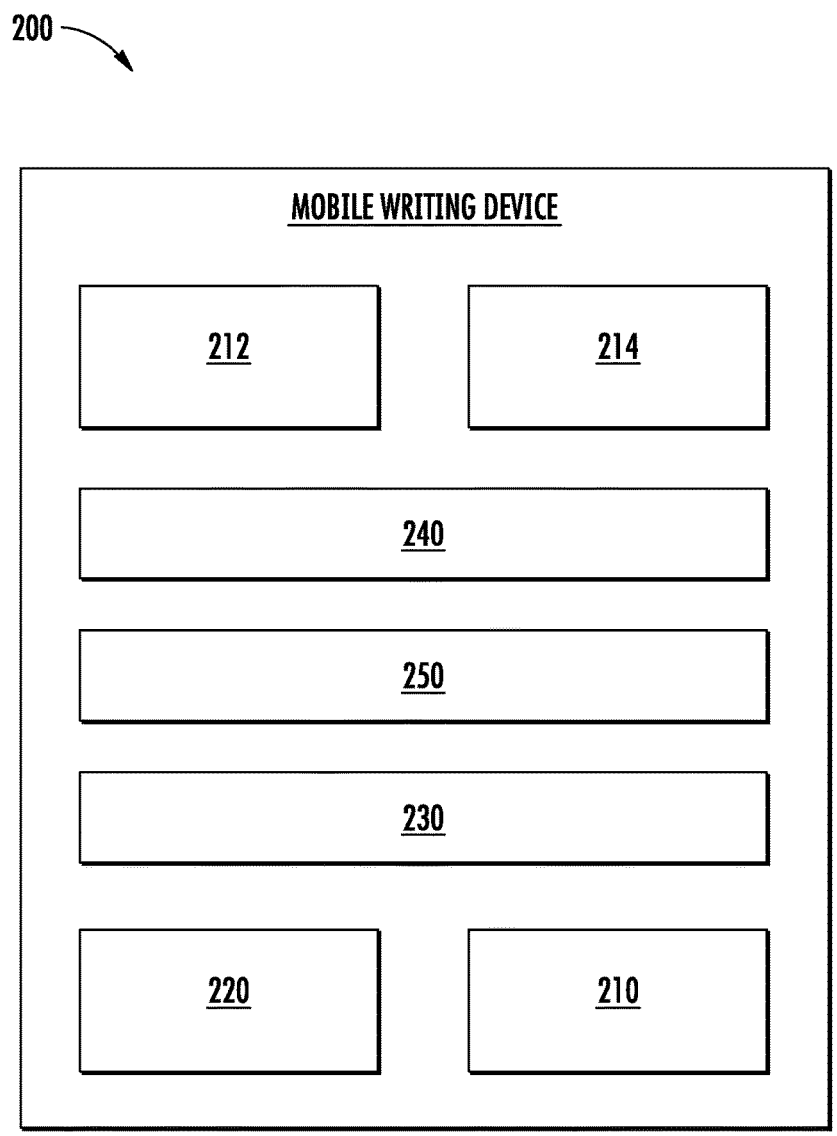
FIG. 3 depicts a block diagram of an example mobile writing device according to example embodiments of the present disclosure.

FIG. 3 depicts a block diagram of one example mobile writing device 200 according to example embodiments of the present disclosure. The mobile writing device 200 can have a form factor similar to the form factor of a pen or other writing utensil. As shown, the mobile writing device 200 can include a repository for ink 210 or other writing material (e.g., graphite). The ink 210 or other writing material can be dispensed onto a surface from a suitable tip. In some embodiments, the ink 210 and/or other writing material can be refilled when the ink 210 or other writing material runs low. In addition, the mobile writing device 200 can include an interface accessible by a user that allows a user to control when the mobile writing device 200 dispenses ink 210 and/or other writing material onto the surface. For instance, the mobile writing device 200 can include a button interface that allows user to operate in the mobile writing device 200 in a dispensing mode when the writing device 200 dispenses ink 210 and/or other writing material onto the surface, and/or a non-dispensing mode when the writing device 200 does not dispense ink 210 and/or other writing material onto the surface.

The mobile writing device 200 can further include image capture hardware (e.g., digital cameras) for capturing images of a surface when the mobile writing device 200 is being used to handwrite information onto the surface. For instance, the mobile writing device 200 includes one or more image sensors 230 configured to capture digital images through one or more lenses 220. The lens(s) 220 can be positioned on the writing device 200 so as to have line of sight with the surface when the mobile writing device 200 is used to handwrite information on the surface. The image sensor(s) 230 can capture light (e.g., visible light, infrared light, ultraviolet light, etc.) received through lens(s) 220 and can convert the light to digital images. Any suitable image sensor(s) 230 can be used to convert the light to digital images, such as CMOS image sensors, CCD image sensors, or combinations thereof.

The mobile writing device 200 can further include one or more inertial measurement units (IMU) 240. The IMU(s) 240 can include sensors and circuitry for determining data associated with movement of the mobile writing device (e.g., an orientation and/or position of the mobile writing device 200 while in use. In some embodiments, the IMU(s) 240 can include one or more accelerometers, gyroscopes, compasses, magnetometers, and other sensors for determining an orientation of the mobile writing device 200. Signals from the IMU(s) 240 can be associated with images captured by the image sensor(s) 230 to facilitate the processing of the images captured by the writing device 200 to generate an image of the surface.

In some embodiments, the mobile writing device 200 can use structured light techniques. For instance the mobile writing device 200 can include one or more light element(s) (e.g., LED, other light emitting source). The mobile writing device 200 can project a pattern (e.g., the target trajectory 174) onto a surface (e.g., the second surface 175), such as an infrared pattern. Images captured of the pattern can be analyzed to determine a distance from one or more points on the mobile writing device 200 to the pattern. These distances can be used to determine an orientation of the mobile writing device 200. This can also be used to determine a deviation of the actual trajectory 172 of the mobile writing device 200 from the target trajectory 174. Other techniques can be used to determine the position and/or orientation of the mobile writing device 200 as it captures images of the surface without deviating from the scope of the present disclosure. For instance, various simultaneous localization and mapping techniques can be used to determine the position and/or orientation of the mobile writing device 200 as it captures images of the surface.

The mobile writing device 200 can further include a communications interface 250 for communicating data, such as data captured by the mobile writing device 200 and position/orientation data, to remote devices. The communications interface 250 can include one or more transmitters, receivers, ports, circuits, and other interfaces for communicating digital information over a wired communication link, wireless communication link, or combination of wired and wireless communication links. As an example, the communications interface 250 can communicate images and orientation data to a remote server over a network (e.g., the Internet) for processing the images to determine information written using the mobile writing device. As another example, the communications interface 250 can communication data to a user device (e.g., a smartphone, tablet, etc.) indicative of the information written using mobile writing device 200 via a wireless interface, such as Bluetooth interface or other suitable communication link.

As further shown in FIG. 3, the mobile writing device 200 can include one or more processors 212 and one or more memory devices 214. The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices.

The one or more memory devices 214 can store information accessible by the one or more processors 212, including computer-readable instructions that can be executed by the one or more processors 212. The instructions can be any set of instructions that when executed by the one or more processors 212, cause the one or more processors 212 to perform operations. For instance, the instructions can be executed by the one or more processors 212 to process images to determine information written by the user of the mobile writing device 200 on the surface. The instructions can be implemented in hardware or in software. When software is used, any suitable programming, scripting, or other type of language or combinations of languages may be used to implement the teachings contained herein.

The one or more memory devices 214 can also store data for manipulation by the one or more processors 212 and/or communication via the communications interface 250. For instance, the one or more memory devices 214 can store images captured by the image sensor(s) 230 and orientation/position data collected by the IMU(s) 240.

In some implementations, the signals from the IMU(s) 240 and the images captured by the image sensor(s) 230 can be processed to detect information associated with the mobile writing device 200. For example, the processors 212 (and/or a remote device) can receive signals acquired by the IMU(s) 240 and/or the images captured by the image sensor(s) 230. The processors 212 (and/or a remote device) can detect a tremor associated with the mobile writing device 200 (e.g., caused by the hand of a user) based on the signals acquired by the IMU(s) 240 and/or the images captured by the image sensor(s) 230. Additionally, and/or alternatively, the processors 212 (and/or a remote device) can detect a path deviation associated with the mobile writing device 200 (e.g., caused by the hand of a user) based on the signals acquired by the IMU(s) 240 and/or the images captured by the image sensor(s) 230. The path deviation can include, for example, ink being dispensed outside the boundaries of a form, an irregularity in a shape the user is attempting to draw, etc. In some implementations, IMU(s) 240 and/or image sensors 230 can be configured to detect a tremor and path deviation without communication with the processors 212 (and/or a remote device). In some implementations, the IMU(s) 240 can authenticate information on the surface (e.g., writing), for example, to prevent fraud similar to that described herein.

The mobile writing device 200 can further include one or more motors 209. The motors can be configured to communicate with one or more of the other components (e.g., 210, 212, 214, 220, 230, 240, 250) of the mobile writing device 200. The motors 209 can be configured to receive one or more signals (e.g., from the processors 212, IMUs 240, sensors 230, remote device). In some implementations, the motors 209 can be configured to receive a signal (e.g., from the processors 212, IMUs 240, sensors 230, remote device) indicating that the mobile writing device 200 (e.g., its ink 210) has experienced a path deviation. The motors 209 can provide haptic feedback (e.g., vibration) to a user of the mobile writing device 200 to indicate the path deviation. Additionally, and/or alternatively, the motors 209 can control the dispensing of ink 210 to help compensate for a deviation.

The mobile writing device 200 can further include a power source (not shown), such as a rechargeable battery, to power the mobile writing device 200. In some embodiments, a socket can be provided for charging the power source. In some embodiments, a portion of the mobile writing device can be placed into a socket configured to receive the mobile writing device (similar to a pen cap or pen holder) to charge the power source. Other suitable schemes for charging the power source can be used without deviating from the scope of the present disclosure. For example, the mobile writing device can be provided with, obtain, and/or use power that is provides via wireless charging, a charging cradle, etc. while the device is in use and/or not in use.

Figure 4:
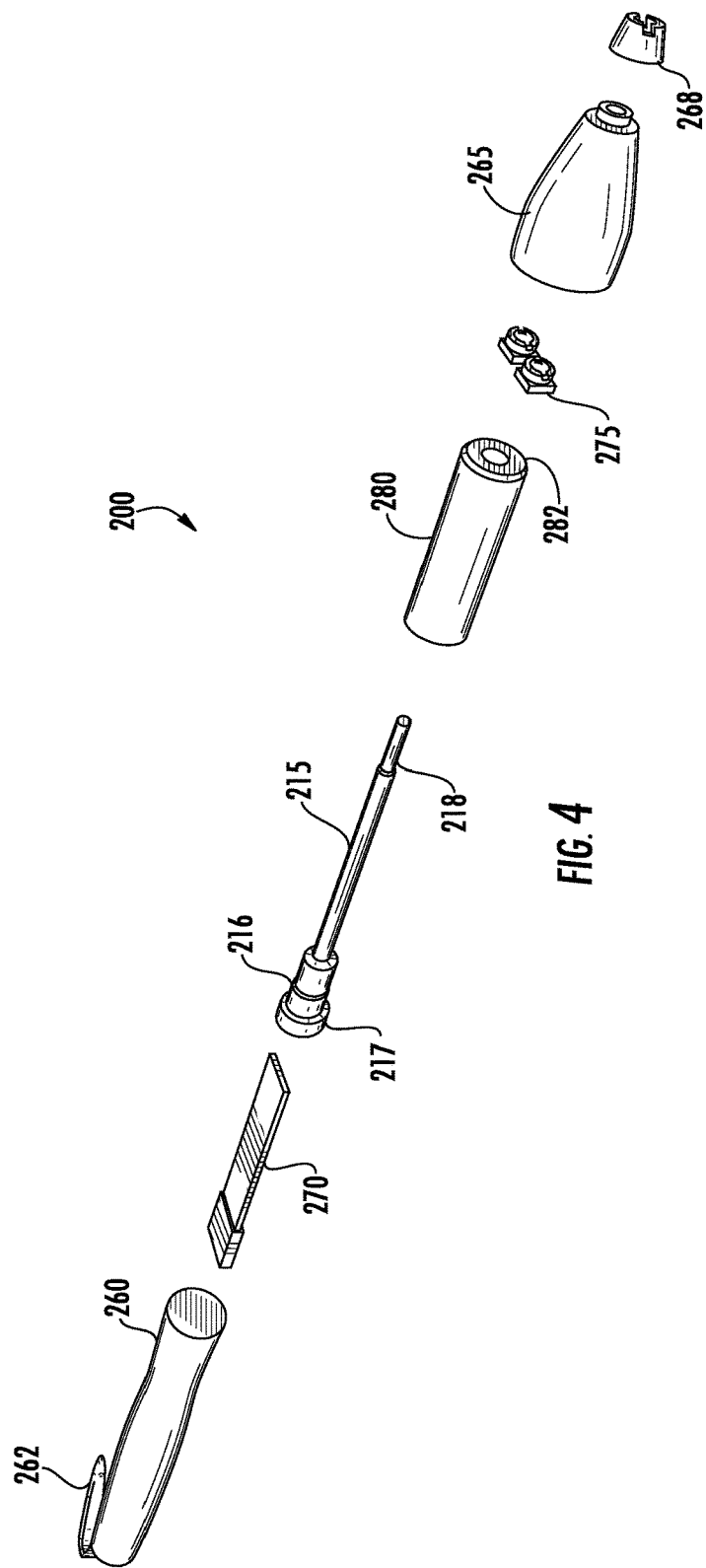
FIG. 4 depicts an example mobile writing device according to example embodiments of the present disclosure.

FIG. 4 depicts an exploded view of one example mobile writing device 200 having a form factor of a pen or other writing utensil according to example embodiments of the present disclosure. The mobile writing device 200 includes an elongated shaft housing 260 for enclosing various internal components of the mobile writing device 200. The elongated shaft housing 260 can have a shape that facilitates gripping of the mobile writing device 200 for use as a writing utensil. The elongated shaft housing 260 can include a clip 262 used to secure the mobile writing device 200, for instance, to a shirt pocket or other suitable surface. In some embodiments, the shaft housing 260 can be formed from a plastic material, a metal material, a combination of plastic and metal materials, or other suitable materials.

The shaft housing can be coupled to a nose cone 265. The nose cone 265 can be clear and/or generally transparent for 360° around the mobile writing device 200 so as to provide a 360° field of view for image capture devices housed as part of the mobile writing device 200. The nose cone 265 can be coupled to a stylus tip 268 (which may not itself transfer writing material to a surface). In some embodiments, the nose cone can include a gradient between a clear part of the nose cone 265 and the shaft housing 260 so as to provide a smoother color transition between the nose cone 265 and the shaft housing 260. The nose cone 265 can include an anti-reflective coating and/or can be made of sapphire, poly-carbonate, borosilicate, fused silicate, acrylic, zeonex, etc.

In some embodiments, the mobile writing device 200 can include a plurality of image capture devices 275. The plurality of image capture devices 275 can be positioned relative to the 360° clear nose cone so as to have a 360° field of view of the surface. The plurality of image capture devices 275 can capture images of the surface as the user is using the mobile writing device 200. According to example embodiments of the present disclosure, images captured of the surface using the image capture devices 275 can be processed to identify information written on the surface by the mobile writing device 200 as well as other information (e.g., preexisting information) written on the surface.

As illustrated, the shaft housing 260 can enclose an ink cartridge 215. The ink cartridge 215 can hold ink for dispensing through a tip 218. The ink cartridge 215 and tip 218 can extend through the clear nose cone 265 and stylus tip 268. In some embodiments, the ink cartridge 215 can include a twist mechanism 216. The twist mechanism 216 can be used to retract and extend the ink cartridge tip 218 relative to the stylus tip 268. For instance, when the twist mechanism 216 is in a first position, the ink cartridge tip 218 can extend through the stylus tip 268 so that the ink cartridge tip 218 can be used to dispense ink onto a surface. When the twist mechanism 216 is in a second position, the ink cartridge tip 218 can be retracted relevant to the stylus tip 268. This can allow the mobile writing device 200 to be carried by a user (e.g., in a user's pocket) without worry of ink being dispensed onto various surfaces. The mechanism described above for extension and/or retraction of the ink cartridge 215 is not intended to be limiting. A person of ordinary skill in the art would understand that other mechanisms can be used for such purpose. For example, the ink cartridge 215 can include a push mechanism and/or one or more other mechanism(s) configured to extend and/or retract the ink cartridge. Additionally, and/or alternatively, the ink cartridge can be covered by a cap and, in some implementations, instead of having a retracting mechanism.

As shown, the ink cartridge 215 can contact a pressure sensor 217. The pressure sensor 217 can generate signals indicative of the pressure by which the ink cartridge tip 218 is being pressed against a surface. In some embodiments, the pressure sensor 217 can also detect the pressure by which the stylus tip 268 is pressed against a surface. The signals indicative of the pressure can be used for a variety of purposes. For instance, the signals indicative of pressures can be used to identify gestures (e.g., double taps of the mobile writing device on a surface) that can be used to trigger various actions.

In one embodiment, the pressure data can be used as part of a handwriting recognition process that can be used for authentication, to prevent fraud, or for other purposes. As an example, images captured of a user's handwriting and/or pressure data can be used to recognize that particular handwriting belongs to a particular user. This information can be used to prevent fraud or for authentication purposes. For instance, a user can be required to sign a signature in order to log in to a particular account or access information on a user device or other computing device in communication with the mobile writing device.

In some embodiments, the handwriting information can be recognized using a classifier model (e.g., a neural network) implemented on a computing device in communication with the mobile writing device. The classifier model can be trained using machine learning techniques based at least in part on pressure data and/or images of handwriting recorded by a mobile writing device with a known user. In some embodiments, optical flow techniques can be used (e.g., in conjunction with motion information obtained by the IMU) to determine handwriting information.

Referring to FIG. 3, the shaft housing 260 can enclose a printed circuit board 270. The printed circuit board 270 can include various electronic components, such as one or more processors, one or more memory devices, communications circuits (e.g., transmitters, receivers, etc.), IMU(s), and other components discussed in detail with reference to FIG. 2.

The printed circuit board 270 can receive power from a suitable power source, such as battery 280. In some embodiments, the battery 280 can have a central opening 282 such that a portion of the ink cartridge 215 can pass through the battery 280. This can allow the mobile writing device 200 to maintain a low center of gravity, improving ease of use and ergonomics of the mobile writing device 200. Additionally, and/or alternatively, the mobile writing device 200 can include a very small ink cartridge such that the mobile writing device 200 has a low center of gravity. In this way, for instance, a cylindrical battery can be located right above it.

The mobile writing device 200 can include other elements without deviating from the scope of the present disclosure. For instance, in some embodiments, as indicated above, the mobile writing device 200 can include a haptic device (e.g., a haptic motor) that can be used to provide vibratory notifications to a user. For instance, the mobile writing device 200 can be configured to vibrate to provide a notification that the mobile writing device 200 is in a record mode where the mobile writing device 200 will record images of the surface. The mobile writing device 200 can also include one or more buttons that can activate functionality of the mobile writing device 200. For instance, a button can be pressed to activate the dispensing of ink or to activate the recording of images of the surface for use in recording information on the surface. Moreover, the mobile writing device 200 can include components that allow it to implement active illumination techniques while it is in use.

As described herein, the mobile writing device 200 can acquire data associated with information presented on the surface 110. For instance, the mobile writing device 200 can capture images of the surface 110 as the mobile writing device 200 is used by the user 120 to handwrite information or perform other gestures (e.g., underlining, circling, pressing). Additionally, or alternatively, the mobile writing device 200 can obtain (e.g., via its senors, other components) data descriptive of a movement of the mobile writing device 200 (e.g., motion, position, orientation, pressure, speed, drag, or the like).

The user device 150 and/or computing system 140 can obtain images captured by the mobile writing device 200. This can allow the device(s) to identify the first and/or second sets of information 135, 170 presented on the first and/or second surfaces 110, 175. The images can be captured, for example, using a wide lens with a short focal length. In some embodiments, the images can be captured from one or more image capture devices positioned behind a clear nose cone. The images can be captured while the user 120 is hand writing information on a surface with the mobile writing device 200. The images can be processed using an image processing pipeline to generate one or more composite images of the surface. The image processing pipeline can generate a machine readable image of the surface from a plurality of images captured using the wide angle, short focal length lens(s) of the mobile writing device. Such processing can be completed by the mobile writing device 200, the computing system 140, the user device 150, and/or other computing device.

Figure 5:
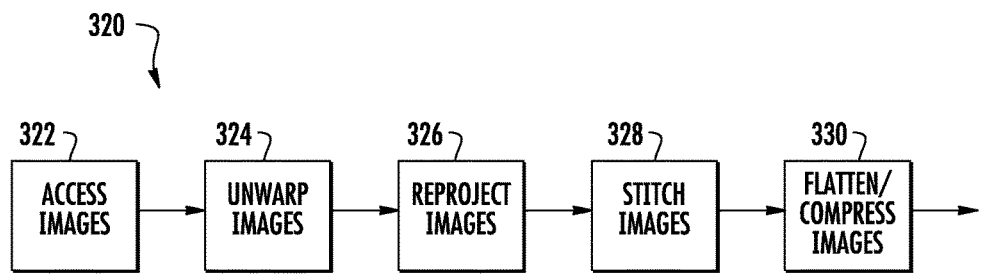
FIG. 5 depicts an example image processing pipeline according to example embodiments of the present disclosure.

One example image processing pipeline 320 is illustrated in FIG. 5. The images captured by the mobile writing device 200 can be received into the pipeline at stage 322. Various processing techniques, such as normalization techniques, can be performed to ready the images for further processing. The images can be unwarped at stage 324 from a perspective associated with the wide angle, short focal length lens(es) of the mobile writing device 200 to a more readable perspective (e.g., a front flattened perspective). The images can be unwarped based, at least in part, on lens parameters associated with the lens(s) of the mobile writing device 200. Using the lens parameters, the images can be transformed to a different perspective. In some embodiments, the images can be unwarped based at least in part on motion and/or orientation data obtained by the IMU.

At stage 326 of the pipeline 320, the method can include reprojecting the images to a plane using, for instance, a homography. For example, in some embodiments, position/orientation data associated with the unwarped images can be used to create a homography for relating the images in a space (e.g., a two-dimensional space). The homography can be generated based on the position/orientation data by determining a motion of the mobile writing devices and lens(s) used to capture the images (e.g., using an IMU). The homograpy can define the positions and orientations of the images relative to one another for use in reprojecting images to a plane associated with the surface.

In one example implementation, stereo imagery captured by a plurality of image capture devices associated with the mobile writing device can be used to triangulate the orientation of a plane (e.g., a plane associated with the surface). A homography can then be generated and/or adjusted based on IMU measurements to generate reprojected images that appear perpendicular to the plane.

At stage 328, the reprojected images can be stitched together using a suitable stitching algorithm to generate one or more composite images of at least a portion of the surface. In one example embodiment, a mask can be generated for the reprojected images by projecting coordinates surround a masked region. The mask can then be used for stitching and blending to indicate which portions of the reprojected images should be included in the composite images of the surface. In some implementations, a two-dimensional Gaussian function can be multiplied by or added to the mask to more heavily weight blending towards the center of the mask. This can be helpful for stitching images captured from image capture devices having a wide angle lens where resolution and focus can drop off away from the center of the image.

In some embodiments, a mask can also be generated to mask one or more occlusions in an image by determining a region in an image that does not change. In one implementation, a standard deviation can be measured for each pixel in a sequence of frames to provide a measure of how much each pixel changes through a sequence of images. A temporal derivative can be also be used as a measure of how much each pixel changes through a sequence of images. A matrix of standard deviations corresponding to the plurality of pixels (or the temporal derivative) in a sequence of image can be thresholded and binarized to produce a mask of an occluded region. Erosion followed by dilation can be implemented to remove noise from the mask.

In some embodiments, the pipeline 320 can further include a flattening process 330. The flattening process can be used, for instance, to remove shadows and to create an even exposure value behind text or other information on the surface. In some embodiments, the shadows can be isolated, for instance, by dilating an image and subsequently eroding it. Each element of an original image can then be divided by elements of the final image to produce the flattened image. In some embodiments, the image can be flattened by a high pass filter that reduces low frequencies in the Fourier domain that may correspond to gradient shadows over the image.

In particular implementations, after flattening, pixels can be added across rows and columns of an image creating a vector of row sums and column sums. The sum can then be thresholded so that the closest index to the edges to exceed a threshold can be used as the edge of a crop of the composite image for input into an image recognition process (e.g., OCR process). For example, the mobile writing device 200, the computing system 140, the user device 150, and/or other computing device can then use one or more textual recognition techniques to identify the information presented on a surface (e.g., 110, 175).

Figure 6:
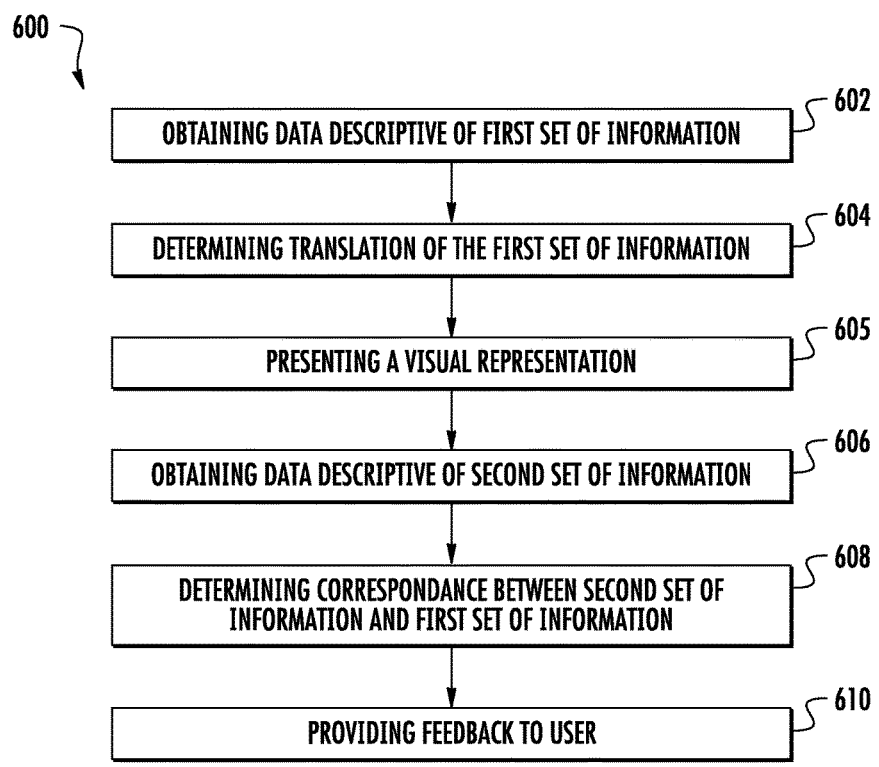
FIG. 6 depicts a flow diagram of an example method of providing a visual writing aid according to example embodiments of the present disclosure.

FIG. 6 depicts a flow chart of an example method 600 of providing a visual writing aid according to example embodiments of the present disclosure. One or more portion(s) of method 600 can be implemented by a computing device such as, for example, the computing device(s) 155 of the user device 150 shown in FIGS. 1 and 7, and/or computing devices of a mobile writing device. Moreover, one or more portion(s) of the method 600 can be implemented as an algorithm on the hardware components of the device(s) described herein (e.g., as in FIGS. 1 and 7) to, for example, provide a visual aid to a user. FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (602), the method 600 includes obtaining data descriptive of a first set of information. For instance, the user device 150 can obtain data 130 descriptive of a first set of information 135. The first set of information 135 is presented in a first language (e.g., Spanish). The first set of information 135 can be presented on a first surface 110. In some implementations, the first set of information 135 can be generated via the mobile writing device 200. The user device 150 can obtain the data 130 descriptive of the first set of information 135 while the first set of information 135 is generated via the mobile writing device 200 on the first surface 110. In some implementations, the first set of information 135 can have already been presented on the first surface 110 (e.g., text in a magazine not generated by the mobile writing device 200).

At (604), the method 600 includes determining a translation of the first set of information. For instance, the user device 150 can determine a translation 160 of the first set of information 135 to a second language (e.g., English). By way of example, the English translation of the Spanish word "PERRO" into English is "DOG". As described herein, the user device 150 (e.g., that is separate and remote from the mobile writing device 200) can itself generate the translation 160 of the first set of information 135 into the second language and/or receive data descriptive of the translation 160 from another device (e.g., the mobile writing device 200, computing system 140).

At (606), the method 600 includes presenting a visual representation of the translation. The user device 150 can present a visual representation 192 of the translation 160 of the first set of information 135 in the second language via one or more display device(s) 190 (e.g., of the user device 150). By way of example, the user device 150 can present the visual representation 192 via the user interface 194 on the display device(s) 190. In some implementations, the user interface 194 can be associated with a software application download to and/or running on the user device 150. The visual representation 192 can be a representation that is visible by a user (e.g., 120). The visual representation 192 can be a textual representation of the translation of the first set of information 135 in the second language. The visual representation 192 can aid the user 120 to transcribe (e.g., using the mobile writing device 200) the information presented in the visual representation 192.

At (608), the method 600 includes obtaining data descriptive of a second set of information. For instance, the user device 150 can obtain data 180 descriptive of a second set of information 170. The second set of information 170 can include a transcription of at least a portion of the first set of information 135 in the second language generated via a mobile writing device 200. The second set of information 170 can be presented on a second surface 175. In some implementations, the second set of information 170 can be gestured (e.g., in air) without presenting written information onto the second surface 175. This can allow the user 120 to practice transcribing the translation 160 of the first set of information 135 without writing anything onto the second surface 175. As described herein, the user device 200 can obtain the data 180 descriptive of a second set of information 170 from the mobile writing device 200 (e.g., in real-time, near real-time while the second set of information 170 is generated) and/or from one or more other computing device(s) (e.g., computing system 140).

At (610), the method 600 includes determining a correspondence between the second set of information and the first set of information. For instance, the user device 150 can determine whether the second set of information 170 corresponds to the visual representation 192 of the translation 160 of the first set of information 135 in the second language. By way of example, the user device 150 can determine whether the transcription of the English word "DOG" is an accurate transcription of the translation 160 of the first set of information 135 (e.g., the Spanish word "PERRO").

In some implementations, the correspondence can be based, at least in part, on the movement (and/or predicted movement) of the mobile writing device 200. For example, the user device 150 can obtain data 182 descriptive of a movement of the mobile writing device 200. The movement of the mobile writing device 200 can be associated with the user's movement of the mobile writing device 200 as the second set of information 170 is transcribed (e.g., on the second surface 175, gestured in air). In some implementations, the user device 150 can obtain the data 182 descriptive of the movement of the mobile writing device 200 (e.g., in real-time, near real-time) while the transcription is being generated via the mobile writing device 200 on a surface (and/or gestured without a surface). The user device 150 can determine a trajectory 172 of the mobile writing device 200 based, at least in part, on the movement of the mobile writing device 200, as described herein.

The user device 150 can determine whether the second set of information 170 corresponds to the visual representation 192 of the translation of the first set of information 135 based, at least in part, on the trajectory 172 of the mobile writing device 200. For example, the user device 150 can compare the trajectory 172 of the mobile writing device 200 to the visual representation 192 of the translation 160 of the first set of information 135 in the second language. Such comparison can be based, at least in part, on one or more characteristic(s) of the transcription and/or the visual representation 192, as described herein. The user device 150 can determine whether the second set of information 170 corresponds to the translation 160 of the first set of information 135 based, at least in part, on the comparison of the trajectory 172 of the mobile writing device 200 to the visual representation 192 (e.g., the textual representation of the translation). In some implementations, the user device 150 can determine whether a correspondence exists based, at least in part, on a comparison of the actual trajectory 172 of the mobile writing device 200 to a target trajectory 174, as described herein.

At (612), the method 600 includes providing feedback to the user. For instance, the user device 150 can provide feedback 189 to a user 120 of the mobile writing device 200 indicating whether the second set of information 170 corresponds to the translation 160 of the first set of information 135. The feedback 189 can include at least one of visual feedback, audio feedback, and haptic feedback. By way of example, the visual representation 192 can be presented via a user interface 194 that indicates a progress of the transcription (e.g., via a change in color of one or more portion(s) of the visual representation 192). In some implementations, the user device 150 can communicate with the mobile writing device 200 to provide the feedback 189 to the user 150. For example, the user device 150 can provide a control signal to the mobile writing device 200 to activate a motor to vibrate the mobile writing device 200 (e.g., to indicate that the user's transcription deviates from the visual representation 192).

Figure 7:
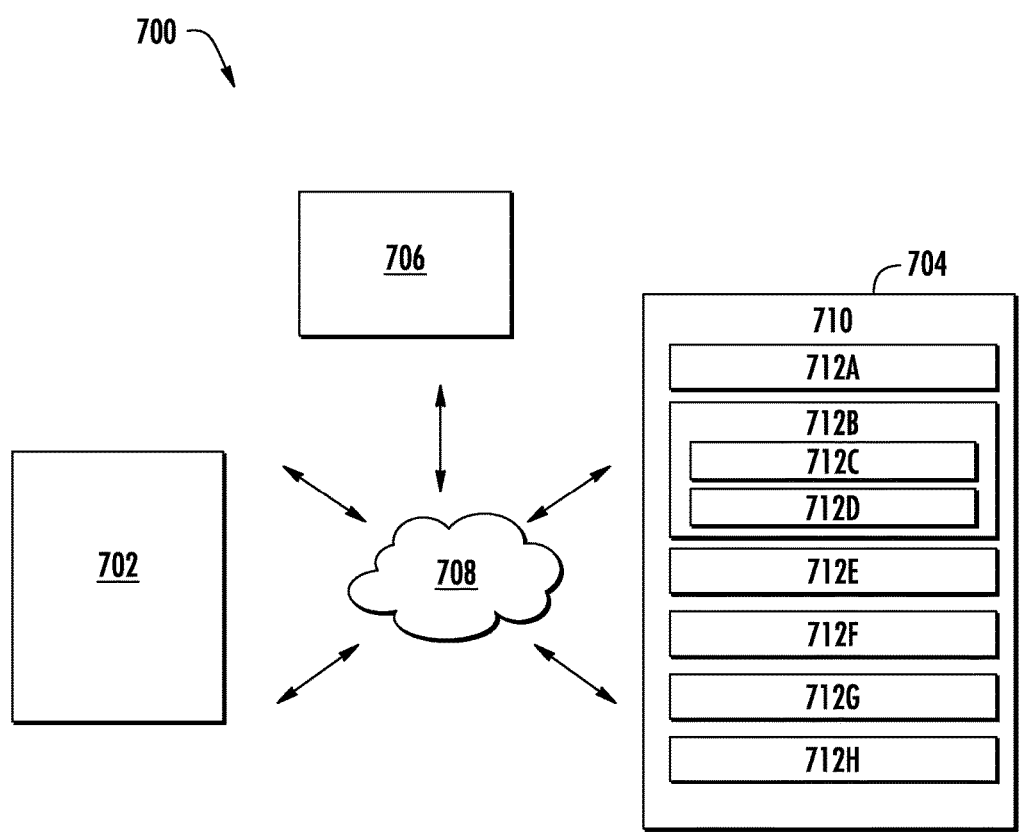
FIG. 7 depicts example system components according to example embodiments of the present disclosure.

FIG. 7 depicts an example system 700 according to example embodiments of the present disclosure. The system 700 can include one or more mobile writing device(s) 702 and one or more user device(s) 704. The mobile writing device(s) 702 can correspond to the mobile writing device(s) (e.g., 200), as described herein. The user device(s) 704 can correspond to the user device(s) (e.g., 150), as described herein. In some implementations, the system 700 can include one or more computing system(s) 706, which can correspond to the computing system(s) (e.g., 140), as described herein. The mobile writing device(s) 702, the user device(s) 704, and/or the computing system(s) 706 can communicate with each other via one or more network(s) 708.

The user device(s) 704 can include one or more computing device(s) 710 (e.g., which can correspond to the computing device(s) 155, as described herein). The computing device(s) 710 can include one or more processor(s) 712A and one or more memory device(s) 712B. The processor(s) 712A can include can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations. The memory device(s) 712B can include can include one or more computer-readable media, including, but not limited to, non-transitory computer-readable media, RAM, ROM, hard drives, flash memory, or other memory devices.

The memory device(s) 712B can store information accessible by the processor(s) 712A, including instructions 712C that can be executed by the processor(s) 710A. The instructions 712C can be software written in any suitable programming language or can be implemented in hardware. Additionally, and/or alternatively, the instructions 712C can be executed in logically and/or virtually separate threads on processor(s) 712A. The instructions 710C can be executed by the processor(s) 710A to cause the processor(s) 710A

(and/or the user device(s) 704) to perform operations. For example, the user device(s) 704 of the system 700 can include one or more tangible, non-transitory computer-readable media storing computer-readable instructions that when executed by one or more processor(s) 712A cause the one or more processor(s) 712A to perform operations. The operations can include any of the operations and functions for which the user device 150 is configured, as described herein, any of the operations and functions of the user device(s) 150, any of the operations and functions for providing a visual writing aid (e.g., method 600), and/or any other operations or functions of the user device(s).

The one or more memory devices 712B can also include data 712D that can be retrieved, manipulated, created, or stored by the one or more processor(s) 712A. The data 712D can include, for instance, data descriptive of a first and/or second set of information, data descriptive of a translation, data descriptive of a movement of the mobile writing device, data descriptive of an actual trajectory of the mobile writing device, data descriptive of a target trajectory, data associated with user feedback, and/or any other data/information described herein.

In some implementations, the user device(s) 704 can include one or more audio output component(s) 712E and/or one or more display output component(s) 712F (e.g., one or more display device(s)). The audio output component(s) 712E can include hardware for audibly producing audio content for a user. For example, the audio output component(s) 712E can include one or more speaker(s), earpiece(s), headset(s), handset(s), etc. The display output component(s) 712F can include hardware for displaying visual media content for a user. For example, the audio output component 710E can include a display screen, CRT, LCD, plasma screen, touch screen, TV, projector, etc. In some implementations, the user device(s) 704 can include one or more sensor(s) 712G. The sensor(s) 712G can include a motion sensor, location sensor, accelerometer, gyroscope, and/or other types of sensors.

The user device(s) 704 can also include a communication interface 712H used to communicate with one or more other component(s) of the system 700 (e.g., the mobile writing device(s) 702) to provide and/or receive data. The communication interface 712H can include any suitable components for interfacing with one more network(s), including for example, transmitters, receivers, ports, controllers, antennas, or other suitable components.

The network 708 can be any type of communications network, such as a local area network (e.g. intranet), wide area network (e.g. Internet), cellular network, or some combination thereof. The network 708 can include a direct (wired and/or wireless) connection between the components of system 700. In general, communication between the components of system 700 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at one computing device can instead be performed at a user device. Likewise, computing tasks discussed herein as being performed at the user device can instead be performed at another computing device.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing a visual writing aid in a second language, comprising:
   obtaining, by one or more computing devices, data descriptive of a first set of information, wherein the first set of information is presented in a first language;
   determining, by the one or more computing devices, a translation of the first set of information to a second language;
   presenting, by the one or more computing devices, a visual representation of the translation of the first set of information in the second language via a display device;
   obtaining, by the one or more computing devices, data descriptive of a second set of information, wherein the second set of information comprises a transcription of at least a portion of the translation of the first set of information in the second language, the transcription generated by a user of a mobile writing device via the mobile writing device; and
   determining, by the one or more computing devices, whether the second set of information corresponds to the visual representation of the translation of the first set of information in the second language, whereby user aid in transcribing the translation is promoted.

2. The computer-implemented method of claim 1, further comprising:
   providing, by the one of more computing devices, feedback to a user of the mobile writing device indicating whether the second set of information corresponds to the translation of the first set of information.

3. The computer-implemented method of claim 2, wherein the feedback comprises at least one of visual feedback, audio feedback, and haptic feedback.

4. The computer-implemented method of claim 1, wherein determining, by the one or more computing devices, whether the second set of information corresponds to the visual representation of the translation of the first set of information in the second language comprises:
   obtaining, by the one or more computing devices, data descriptive of a movement of the mobile writing device;
   determining, by the one or more computing devices, a trajectory of the mobile writing device based at least in part on the movement of the mobile writing device; and
   determining, by the one or more computing devices, whether the second set of information corresponds to the visual representation of the translation of the first set of information based at least in part on the trajectory of the mobile writing device.

5. The computer-implemented method of claim 4, wherein the one or more computing devices obtain the data descriptive of the movement of the mobile writing device while the transcription is being generated via the mobile writing device on a surface.

6. The computer-implemented method of claim 4, wherein determining, by the one or more computing devices, whether the second set of information corresponds to the visual representation of the translation of the first set of information based at least in part on the trajectory of the mobile writing device comprises:
   comparing, by the one or more computing devices, the trajectory of the mobile writing device to the visual representation of the translation of the first set of information in the second language; and
   determining, by the one or more computing devices, whether the second set of information corresponds to the translation of the first set of information based at least in part on the comparison of the trajectory of the mobile writing device to the visual representation.

7. The computer-implemented method of claim 1, wherein the visual representation is presented via a user interface that indicates a progress of the transcription.

8. The computer-implemented method of claim 1, wherein the first set of information is presented on a surface, and wherein the first set of information is generated via the mobile writing device.

9. The computer-implemented method of claim 8, wherein the one or more computing devices obtain the data descriptive of the first set of information while the first set of information is generated via the mobile writing device on the surface.

10. A computing system for providing a visual writing aid, the system comprising:
   one or more processors;
   one or more memory devices, the one or more memory devices storing instructions that when executed by the one or more processors cause the one or more processors to perform operations, the operations comprising:
   obtaining data descriptive of a first set of information in a first language;
   presenting a visual representation of a translation of the first set of information in the second language via a display device;
   obtaining data descriptive of a movement of a mobile writing device associated with a second set of information, wherein the second set of information comprises a transcription of at least a portion of the first set of information in the second language generated via the mobile writing device by a user of the mobile writing device; and
   determining whether the second set of information corresponds to the translation of the first set of information in the second language based at least in part on the movement of the mobile writing device.

11. The computing system of claim 10, wherein obtaining data descriptive of the movement of the mobile writing device associated with the second set of information comprises:
   obtaining the data descriptive of the movement of the mobile writing device as the mobile writing device generates the transcription.

12. The computing system of claim 10, wherein determining whether the second set of information corresponds to the translation of the first set of information in the second language based at least in part on the movement of the mobile writing device comprises:
   determining a trajectory of the mobile writing device based at least in part on the movement of the mobile writing device; and
   determining whether the second set of information corresponds to the translation of the first set of information based at least in part on the trajectory of the mobile writing device.

13. The computing system of claim 10, wherein the first set of information is presented as written text on a first surface, and wherein the second set of information is presented at written text on a second surface that is different from the first surface.

14. The computing system of claim 10, wherein the operations further comprise:
   obtaining, from the mobile writing device, data descriptive of the translation of the first set of information in the second language.

15. The computing system of claim 10, wherein the operations further comprise:
   adjusting one or more elements of the visual representation to indicate a progress associated with the second set of information as the transcription is generated via the mobile writing device.

16. The computing system of claim 15, wherein the progress is indicated by a change in one or more colors associated with the visual representation.

17. A user computing device comprising:
   one or more display devices;
   one or more processors; and
   one or more memory devices, the one or more memory devices storing instructions that when executed by the one or more processors cause the one or more processors to perform operations, the operations comprising:
   obtaining data descriptive of a first set of information in a first language;
   presenting a visual representation of a translation of the first set of information in the second language via the one or more display devices;
   obtaining data descriptive of a second set of information, wherein the second set of information comprises a transcription of at least a portion of the first set of information in the second language on a surface, wherein the transcription is generated by a user of a mobile writing device via the mobile writing device; and
   determining whether the second set of information corresponds to the translation of the first set of information in the second language.

18. The user computing device of claim 17, wherein the visual representation is a textual representation of the translation of the first set of information in the second language.

19. The user computing device of claim 17, wherein the operations further comprise:
   determining a target trajectory for the mobile writing device based at least in part on the textual representation of the translation of the first set of information in the second language; and
   providing, to the mobile writing device, data descriptive of the target trajectory, wherein the mobile writing device is configured to present the target trajectory on the surface.

20. The user computing device of claim 19, wherein determining whether the second set of information corresponds to the translation of the first set of information in the second language comprises:
- obtaining data descriptive of a movement of the mobile writing device;
- determining an actual trajectory of the mobile writing device based at least in part on the movement of the mobile writing device; and
- determining whether the second set of information corresponds to the visual representation of the translation of the first set of information based at least in part a comparison of the target trajectory of the mobile writing device and the actual trajectory of the mobile writing device.

* * * * *